Feb. 10, 1970 D. P. DIXON 3,494,540
AUTOMOBILE AIR CONDITIONING SYSTEM
Original Filed March 11, 1968 4 Sheets-Sheet 1
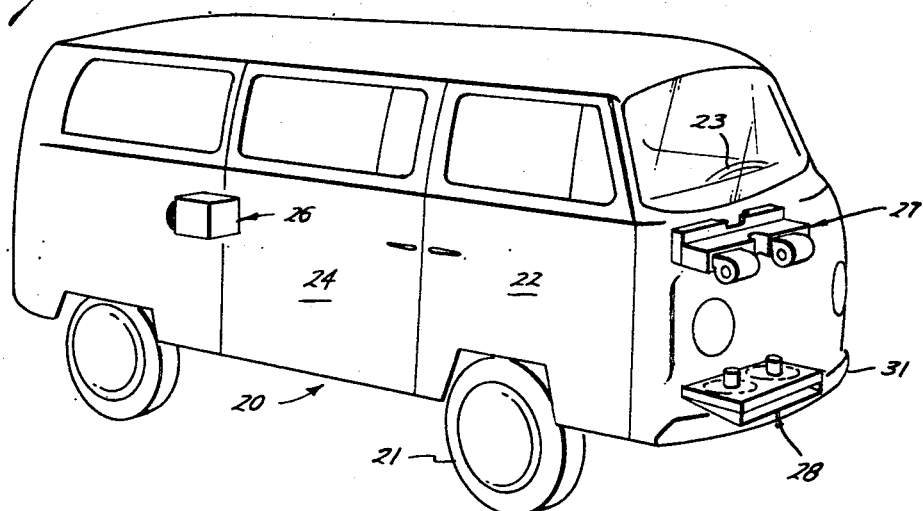
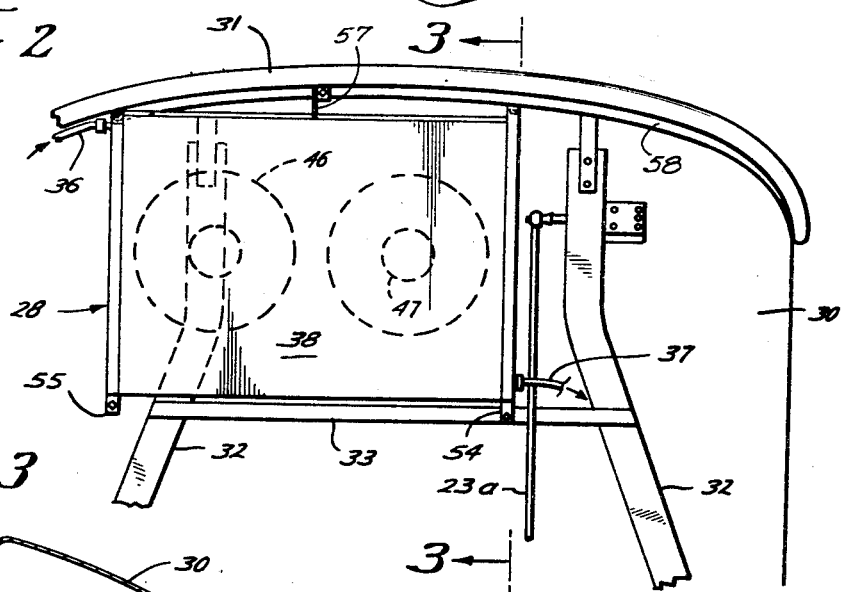
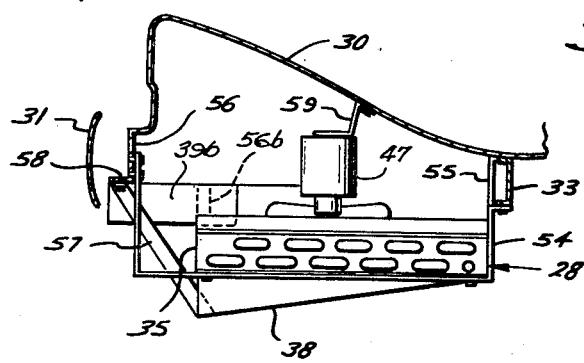
Don P. Dixon
INVENTOR.
ATTORNEYS

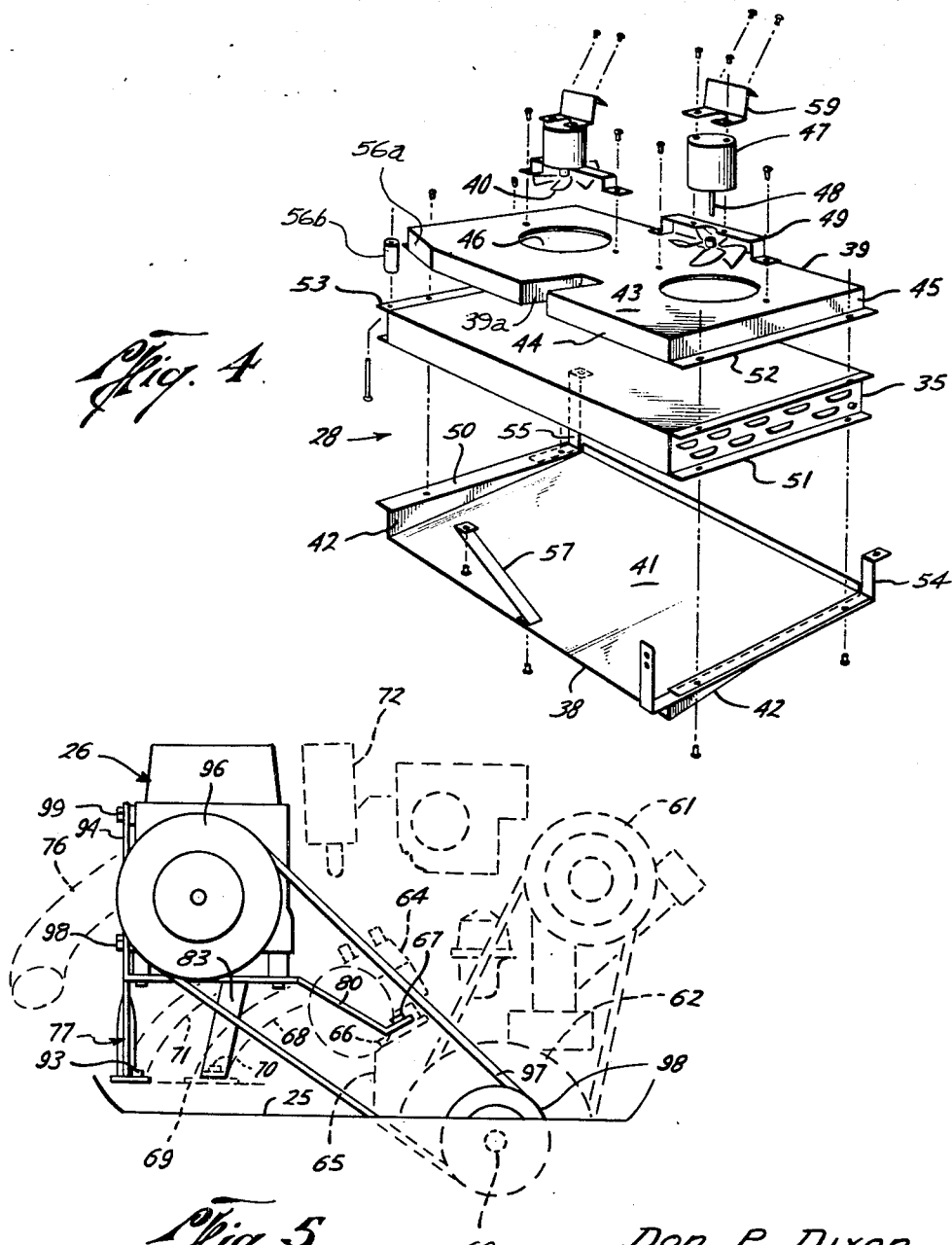

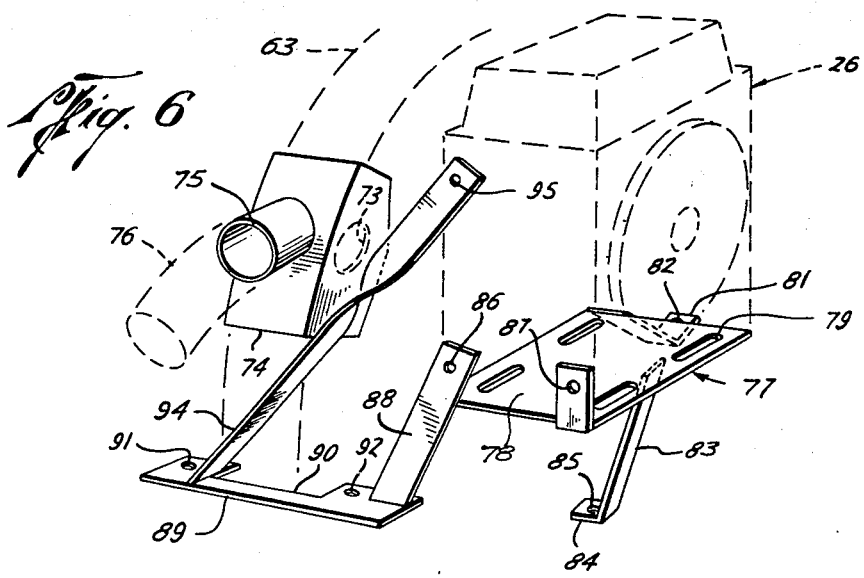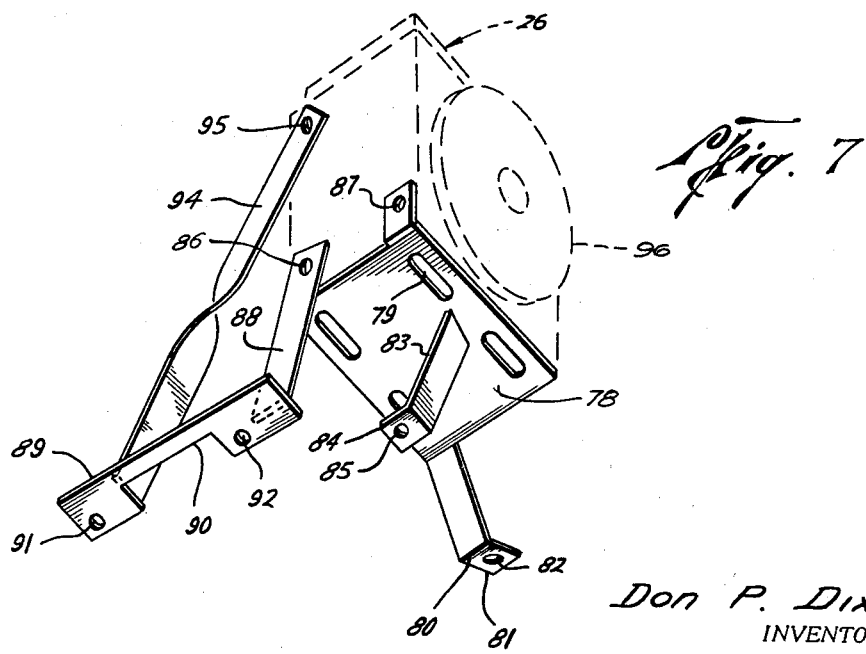

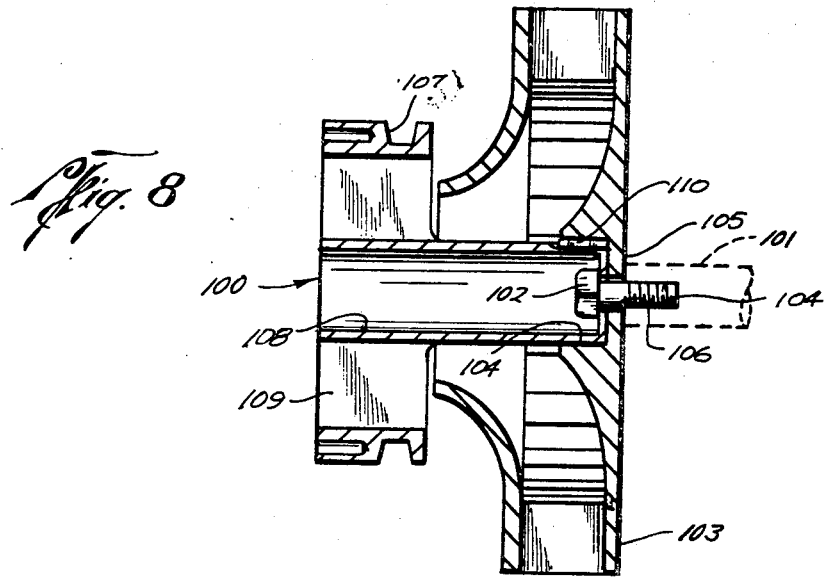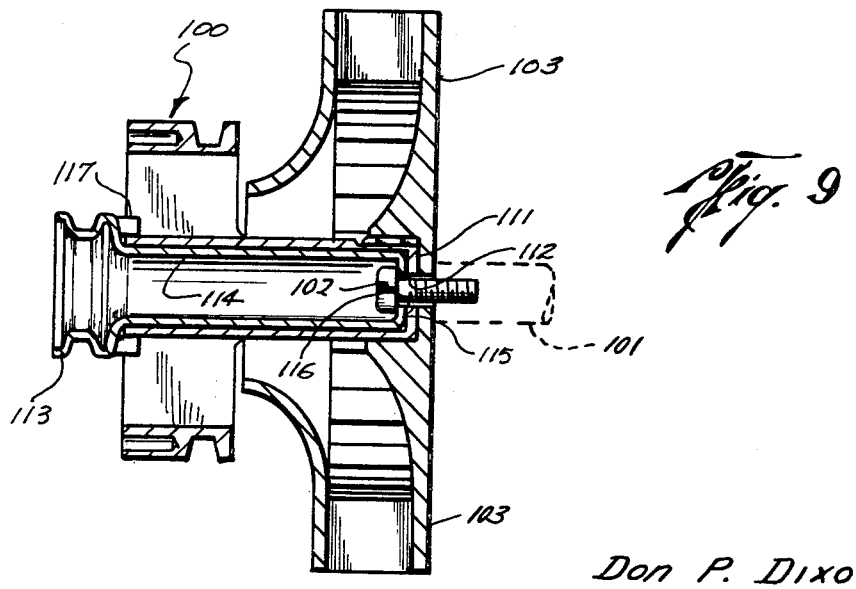

United States Patent Office 3,494,540
Patented Feb. 10, 1970

3,494,540
AUTOMOBILE AIR CONDITIONING SYSTEM
Don P. Dixon, 2011 Sable Lane,
San Antonio, Tex. 78209
Original application Mar. 11, 1968, Ser. No. 712,216.
Divided and this application Apr. 28, 1969, Ser.
No. 819,611
Int. Cl. F04b *39/00;* F25b *1/00*
U.S. Cl. 230—235                                    2 Claims

ABSTRACT OF THE DISCLOSURE

A bus type Volkswagen automobile having an air conditioning system in which the condenser assembly is mounted on the underside of the frame beneath the passenger compartment and forwardly of the front axle, and the compressor is mounted on the left-hand side of the motor in a rear compartment of the automobile. The condenser assembly includes a relatively thin coil arranged with its wide faces extending horizontally, an air scoop beneath the coil, a shroud providing an enclosed space above the coil, a fan for drawing air from the space, and means for supporting the coil, scoop, shroud, and fan from the underside of the floorboard of the automobile. The compressor is supported on a bracket which is connected to the motor by existing parts which connect the distributor bracket and a heat exchanger conduit to the engine block and a sheet metal covering to the cylinder head. A "1600" Series type Volkswagen having an air conditioning system in which the compressor is connected to the crankshaft by a pulley adapted to be connected to the crank shaft by the same bolt which connects a pulley thereto for driving the generator.

---

This invention relates to air conditioning systems for automobiles; and, more particularly, improved systems which are especially well suited for certain models of the Volkswagen automobile.

This application is a division of my copending application Ser. No. 712,216, filed Mar. 11, 1968 and entitled "Automobile Air Conditioning System."

Conventional air conditioning systems are not suited to the compact construction of the Volkswagen automobile. That is, there is a very basic problem in finding room for the components of the system, at least without a major modification of the construction of the Volkswagen and/or the use of specially designated parts, or without interfering with access to other parts of the automobile which may require replacement or repair. This is particularly true of the compressor for the system which must be located adjacent the power take-off on the crankshaft of the rear mounted motor of the automobile, where space is especially critical even without the addition of other parts.

Because of the space problem, as well as a desire to avoid overheating the engine of this type of automobile, it has been proposed to locate the condenser assembly of the air conditioning system at the front end and beneath the frame of the car in a position to be cooled by outside air. The design and installation of the assembly in this general area is nevertheless a problem because of the limited space in which said assembly may be placed without being too close to the ground surface. This is especially true of the bus type Volkswagen automobile in which, as compared with other models, a portion of the passenger compartment is above and forward of the axle for the front wheels.

The installation of a compressor for such a system is still further complicated by the power take-off of the crankshaft of the "1600" Series or "Square Back" type of Volkswagen. More particularly, because of the construction of the pulley and associated parts connected to the crankshaft, there is no readily apparent way in which to connect a second pulley for the compressor to the shaft.

An object of this invention is to provide the bus type Volkswagen automobile with an air conditioning system having a compressor and a condenser assembly which are compact, employ standard parts, and require no major reconstruction of the automobile.

Another object is to mount the compressor of such a system in such a manner within the rear compartment of a Volkswagen type of automobile as to take maximum advantage of existing parts of the motor.

A further object is to mount the condenser assembly of such a system in such a manner beneath the front end of the frame of a bus type Volkswagen automobile as to avoid any modification of the existing parts of the automobile, other than the attachment thereto of a few brackets.

A still further object is to provide a condenser assembly which is of compact and inexpensive construction and which is especially well adapted for accomplishing the foregoing object.

Yet a further object is to connect the compressor of such a system to a "1600" Series Volkswagen in such a way as to avoid modification of existing parts, and more particularly, to do so by means of a part which is relatively inexpensive to manufacture and easy to install.

In the drawings, wherein like reference characters have been used throughout to designate like parts:

FIG. 1 is a perspective view from the front and one side of a bus type Volkswagen automobile, with the components of an air conditioning system constructed and arranged in accordance with the present invention superimposed upon such automobile;

FIG. 2 is a view taken from the underside of the front end of the frame and showing the condenser assembly of the air conditioning system mounted thereon;

FIG. 3 is a side view of the condenser assembly, as seen along broken lines 3—3 of FIG. 2;

FIG. 4 is an exploded perspective view of the condenser assembly;

FIG. 5 is an elevational view of the rear compartment of the automobile of FIG. 1, showing the components of the motor in broken lines and the compressor of the air conditioning system mounted thereon by means of a bracket;

FIG. 6 is a perspective view of the bracket, with the compressor shown in broken lines, and as seen from above and to the left of the rear motor compartment;

FIG. 7 is another view of the bracket and compressor similar to FIG. 6, but as seen from below and to the left of such compartment;

FIG. 8 is an enlarged sectional view of an existing pulley mounted on the end of the crankshaft, which is shown in broken lines, of the "1600" Series of "Square Back" type of Volkswagen automobile; and FIG. 9 is a sectional view similar to FIG. 8, but with a second pulley connected to the crankshaft for receiving a belt for driving the compressor of an air conditioning system for such Volkswagen.

With reference now to the above described drawings and particularly FIG. 1, the bus type Volkswagen automobile shown therein, and designated in its entirety by reference character 20, has a passenger compartment which extends substantially the full length of its frame. Thus, the floorboard 30 beneath the front seat is above and forward of the axle for the front wheels 21. Access is had to this area through front doors 22, and a steering wheel 23 is mounted on the left side thereof almost adjacent the front end of the automobile. Additional doors 24 are provided at an intermediate portion of the sides of the frame of the automobile for access to the middle seat and rear portions of the passenger compartment. As in other types of Volkswagen automobiles, the motor is mounted in a compartment at the rear of the automobile, and access is had to it through a door (not shown) in a lower portion of the rear end of the automobile.

As indicated in FIG. 1, the air conditioning system of the automobile 20 includes a compressor 26 which is mounted in the rear compartment thereof, an evaporator 27 which is mounted beneath the dashboard (not shown) in the driving area of the passenger compartment, and a condenser assembly 28 which is mounted beneath the driving area. These various parts of the system are connected together with suitable conduits to permit the circulation therethrough of refrigerant, as well known in the art, and the following description will be devoted toward the novel aspects of the construction, mounting and arrangement of the compressor 26 and condenser assembly 28.

As shown in FIGS. 2 and 3, the condenser assembly 28 is supported from the floorboard 30 of the frame of the automobile intermediate the bumper 31 at its front end and the axle for the front wheels 21. As shown in FIG. 2, the frame includes a pair of frame members 32 extending beneath the floorboard and rearwardly from the front end of the automobile and a bracing channel 33 extending laterally between the members 32. There is also a rod 23a which is connected to the steering wheel 23 and extends longitudinally beneath the floorboard just inboard of the left frame member 32. In order to avoid interference with these existing parts, the condenser assembly 28 is disposed to the right of the rod 24 and somewhat off-center, with a portion of one end thereof disposed beneath the right frame member 32. Also, the front end of the condenser assembly is closely adjacent the back side of the bumper 31, so that the rear end thereof is close to the channel 33 (see FIG. 3).

As best shown in FIG. 4, the condenser assembly 28 includes a coil 35 of conventional construction comprising tubing having plate fins extending there across. This coil is relatively thin and, when mounted, as best shown in FIG. 2, is disposed with its top and bottom wide faces extending generally horizontally. Conduits 36 and 37 are connected with opposite sides of the coil so as to circulate refrigerant through the tubing in a well-known manner.

An air scoop 38 extends across the bottom face of the coil 35 and a shroud 39 extends across the top face thereof, and the three components are connected together to permit their installation as a unit, as will be described. The air scoop 38 provides a forwardly facing and rearwardly diminishing opening for directing air to the bottom face of the coil 35 during forward movement of the automobile. The shroud 39, on the other hand, provides an enclosed space above the top face of the coil 35 to receive air passing therethrough, which air then passes through openings in the shroud.

As best shown in FIG. 4, the air scoop 38 includes a bottom wall 41 which extends between triangularly shaped end walls 42. More particularly, the bottom wall tapers downwardly and forwardly from an open top of the air scoop which, upon assembly, is disposed across the bottom face of coil 35. As also shown in FIG. 4, shroud 39 includes a top wall 43 and relatively shallow side and end walls 44 and 45, respectively, which define an enclosed space coextensive with the top face of the coil.

A pair of openings 46 are formed in the top wall 43 of the shroud 39, each to receive a fan 40 adapted to rotate therein and, more particularly, each fan is rotated by means of an electric motor 47 supported from the floorboard 30 in a manner to be described. The drive shaft 48 of each motor is guided by a bracket 49 spanning the opening 46 and connected to the top wall 43 of the shroud.

The air scoop 38 and the coil 35 have outwardly extending flanges 50 and 51 on the upper end edges of the end walls 42 of the scoop and the lower end edges on the end walls of the coil 35, respectively, which are adapted to register with one another. The shroud 39 has outwardly extending flanges 52 on the lower edges of its end walls 45 which register with outwardly extending flanges on the upper edges on the top face of the coil 35. These registering flanges are interconnected with one another by suitable fasteners, as indicated in FIG. 4.

The air scoop 38, and thus the coil 35 and shroud 39 disposed thereabove, is supported from the floorboard 30 by means which include a pair of brackets 54 and 55. The first bracket 54 is U shaped and extends beneath the entire length of the flange 50 on the left hand side of the air scoop, while the second flange 55 is L shaped and extends beneath only the rear end of flange 50 on the right side of the air scoop. The forward portion of the right side of the unit is supported from the underside of the frame by a fastener which extends through a spacer sleeve 56, as will be described to follow. As shown in FIG. 4, a corner of the shroud 39 is removed at 56a to accommodate the sleeve. Also, a mid-portion 39a in the side wall at the front of the shroud is relieved to accommodate a towing part 39b extending from the front of the frame, as shown in FIG. 3.

As indicated in FIG. 4, the base of bracket 54 is connected to the left flange 50 of the air scoop by the same fasteners which secure that flange to the flange 51 on the left side of coil 35. The bottom leg of the bracket 55 may be similarly connected to the flange 50 on the right side of the air scoop. As shown in FIG. 3, the rear end of the bracket 54 extends upwardly and rearwardly for connection by a suitable fastener to the lower flange of channel 33 of the automobile frame, while the forward end thereof is secured to a wall 56 on the frame which extends downwardly from the floorboard 30 just rearwardly of the bumper 31. The bracket 55 also includes an upwardly extending leg having a rearwardly extending part which is fastened directly to the floorboard 30 to one side of member 33. Further support for the air scoop 38 is provided by means of an upwardly and forwardly extending strap 57 connected at its lower end to the front edge of the bottom wall 41 of the air scoop and at its upper end to a forwardly directed rim 58 on the lower end of wall 56. The fastener which extends through sleeve 56a also connects directly to the rim 58 where it is curved behind the bumper 31.

Each of the fan motors 47 is supported beneath the automobile by means of a Z shaped bracket 59 having a lower flange fastened to the upper end of the motor 47 and having a downwardly and rearwardly extending flange at its upper end for direct fastening to the floorboard, as shown in FIG. 3.

Thus, as will be appreciated, the installation of condenser assembly 28 requires little or no alteration of the existing parts of the automobile. Furthermore, it consumes very little space beneath the floorboard, and in fact is not much lower than the lowest point on an existing automobile of this type. At the same time, the condenser assembly is mounted and arranged in such a manner that it requires a minimum of time and effort to install it, or to repair or replace its individual parts.

As shown in FIG. 5, the compressor 26 is mounted on the motor in a rear compartment of the automobile to which access may be had through an opening 25 in the rear wall, which is closed by means of a door swingable about a horizontal axis. This motor includes a crankshaft 60 having a pulley 62 connected to it which in turn is connected to a pulley on a generator 61 for driving same. More particularly, this crankshaft extends rearwardly from an air heater housing 63 which, as indicated in broken lines in FIG. 6, extends laterally across a forward portion of the rear motor compartment. The motor also includes a distributor 64 which is mounted on the motor above and to the left of the crankshaft 60 by means of a bracket 66 secured to the engine block 65 by a bolt 67. There is also a heat exchanger having a pair of conduits extending laterally of the motor compartment, one conduit 68 having a flange 69 secured by a bolt 70 to the engine block generally to the left of the distributor 64 and the second conduit 71 connecting with the cylinder head of the motor to the left and somewhat forwardly of the flange on the first conduit 68.

Prior to installation of the compressor 26 of the air conditioning system of the present invention, an electrical coil 72 is mounted on the rear wall of the heater housing in a position to be occupied by the compressor. Thus, in order to install the compressor 26, this coil is moved to the right and generally to the position shown in FIG. 5. Also, in the motor compartment prior to installation of the compressor, a hose extends rearwardly from the rear face of the heater housing 63 into an area which is also to be occupied by the compressor 26. Thus, the hose is removed and the existing hole 73 in the front side of the housing 63 from which the hose extends is covered by a U shaped fitting 74 which is fastened onto the housing 63. As shown in FIG. 6, this fitting 74 has a tube 75 extending from the left end of the housing for connection with a hose 76 which, as indicated in FIG. 5, extends to the left and then rearwardly within the motor compartment on the outer side of the area to be occupied by the installed compressor 26. When these slight modifications to the existing motor have ben made, a bracket 77 may then be connected to the motor in such a position to mount the compressor 26 as shown in the drawings. In such position, the compressor does not seriously interfere with other parts of the motor to be replaced or repaired.

As shown in FIGS. 5 to 7, the bracket 77 includes a flat plate 78 having two pairs of slots 79 extending parallel to its sides for use in attaching the bottom of the compressor to the upper surface of the plate 78 in a manner to be described. A leg 80 extends downwardly and outwardly from the right end of the plate 78 and has an upwardly extending flange or foot 81 on its free end. More particularly, the flange 81 turns up, as shown in FIG. 5, to lie flat on bracket 66, and has a hole 82 therein to receive the bolt 67 which secures the bracket 66 on the distributor 64 to the engine block 65. A second leg 83 extends downwardly from the lower surface of the plate 78 intermediate its right and left hand ends and has a flange 84 on its lower end. This flange extends rearwardly from the leg 83 to lay flat on the flange 69 and has a hole 85 therein to receive the bolt 70 which secures the flange 69 to the engine block 65.

A pair of ears 86 extend upwardly from the left end of the plate 78, and each has a hole 87 therein to receive bolts for attachment to an end of the compressor 26, in a manner to be described. The forward ear 86 is provided by the upper end of a first leg 88 of an extension on the left side of the plate 78. This extension also includes a second leg 89 which extends rearwardly from the lower end of the first leg 88, and has an intermediate portion along its right hand edge which is recessed at 90 to accommodate the second conduit 71 of the heat exchanger. Also, there are holes 91 and 92 in the leg 89 rearwardly and forwardly of the recess each to receive bolts for securing the leg 89 to the upper side of the cylinder head. More particularly, these are existing bolts 93 which also serve to secure a sheet metal cover to the cylinder head.

The extension from the plate 78 also includes a third leg 94 which extends upwardly and forwardly from a forward portion of the leg 89. More particularly, the leg 94 is twisted to provide a flat face at its upper end for disposal adjacent the end of the compressor 26 above the ears 86. More particularly, this face is in substantially the same plane as the inner faces of ears 86 and there is a hole 95 in the free end of the leg 94 to receive a bolt for connecting this leg to the end of the compressor.

As shown in FIGS. 5 to 7, the compressor has a pulley 96 mounted on its rear side to receive a belt 97 which also extends about a pulley 98 on the crankshaft 69 for driving the compressor. The left end of the compressor is provided with tapped holes to receive bolts 98 and 99 through the holes in ears 86 and leg 94, respectively. There are also tapped holes on the bottom of the compressor to receive bolts which extend through the slots 79, which enable one or more of the bolts to be manipulated in moving the compressor small amounts from left to right for adjusting the tension in the belt 97. One or both of the bolts 98 may be used for this purpose, and, when the compressor has thus been properly located, shims may be disposed about the bolt 99 between the leg 94 and the compressor.

As shown in FIG. 8, a pulley 100 for receiving a belt adapted to drive the generator of a "1600" Series or "Square Back" type of Volkswagen is secured to the crankshaft 101 of the motor for rotation therewith. More particularly, a fan 103 as well as the pulley 100 are connected to the crankshaft 101 by bolt 102 threaded into a tapped opening 104 in the end of the crankshaft.

As shown, the fan 103 has a hub with a recessed portion 104 therein and an outer wall 105 extending transversely to the axis of the hub to provide an opening 106 therein for receiving the bolt 102. The outer rim of the pulley 100 in which the belt groove 107 is provided is connected to a hollow axle 108 by means of vanes 109. An extension of the hollow axle 108 extends axially to one side of the pulley for fitting closely within the recessed portion 104 of the hub of fan 103, and a key 110 between the portion 104 and the end of the axle extension provides a rotary drive connection therebetween.

An inwardly turned flange 111 on the end of the extension abuts with the inner face of the wall 105 of the fan 103 when the extension is moved into the recessed portion 104. More particularly, this flange 111 defines a hole 112 which is aligned with the hole 106 in the fan so as to receive the bolt 102 therethrough. When fully made up, the enlarged head of the bolt secures the flange 111 and the wall 105 to the crankshaft 100.

As shown in FIG. 9, another pulley 113 is connected to the crankshaft 101 for receiving a belt for driving a compressor of an air conditioning system mounted on the motor of this "1600" type of Volkswagen. More particularly, and in accordance with the present invention, this second pulley 113 is also connected to the crankshaft by the bolt 102.

As shown, pulley 113 has a belt groove thereabout and a hollow sleeve 114 extends axially from the inner side thereof for fitting rather closely within the axle 108 and its extension on the pulley 100. As can be seen from FIG. 9, the outer diameter of the sleeve 114 is less than that of the pulley 113 so that the pulley has an annular shoulder about its inner side for disposal opposite the outer side of the pulley 100.

As also shown in FIG. 9, the sleeve 114 is of substantially the same length as the axle 108 and its extension to dispose a flange 115 on its end close to the flange 111 when the sleeve 114 is moved fully into the axle 108 and its extension. This flange defines an opening 116 therethrough which is aligned with the openings 106 and 112 when the sleeve is so disposed. Thus, the bolt 102 may be moved through the hole 116 as well as through the holes 106 and 112 so as to secure pulley 113, pulley 100 and fan 103 to the crankshaft 101.

More particularly, the length of the sleeve 114 is slightly less than the length of the axle 108 and its extension, and the pulley 113 and extension are made from a relatively thin gauge metal which may be stretched and/or flexed. In this way, as the bolt 102 is made up with the tapped opening 104, the inner side of the pulley 113 is first caused to engage with the outer side of the pulley 100, and the flange 115 on the sleeve is then caused to engage the flange 111 and be secured between the head on the bolt and such flange.

Tabs 117 are punched from the inner side of the pulley 113 for disposal between the vanes 109 of the pulley 100, which provides a simple rotary drive connection between the pulley 100 and the pulley 113. As will be understood from the foregoing, this provides a very secure connection of the pulley 113 to the crankshaft. Furthermore, the manufacturer of the pulley and sleeve of thin gauge metal enables them to be made without machining or other expensive procedures.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. For use in an air conditioned automobile having a motor mounted in a rear compartment; a compressor having a pulley on one side, a bracket including a flat plate having parallel slots therethrough extending in a direction parallel to the sides of the plate and an upper surface to support the bottom of the compressor, a leg extending downwardly and outwardly from one end of the plate and having a hole in its free end to receive a bolt for connecting it to one portion of the motor, a second leg extending downwardly from the lower surface of the plate intermediate its ends and having a hole in its end to receive a bolt for connecting it to another portion of the motor, an ear projecting upwardly from the other end of the plate and having a hole thereon, and an extension from the plate including a first leg extending downwardly from its other end, a second leg extending laterally from the lower end of the first leg, one side of the second leg being recessed and having a hole therein at each end of the recess to receive bolts for connecting it to still another portion of the motor, and a third leg extending angularly upwardly from the free end of the second leg and toward said first leg said third leg having a hole in its free end at a level above the upper surface of the plate, tapped holes in the bottom of the compressor to receive bolts extending through the slots in the mounting plate, and additional tapped holes in one end of the compressor to receive bolts extending through the hole in the ear and the free end of said third leg.

2. For use in an air conditioned automobile having a motor mounted in a rear compartment; a compressor having a pulley on one side, a bracket including a flat plate having parallel slots therethrough extending in a direction parallel to the sides of the plate and an upper surface to support the bottom of the compressor, a leg extending downwardly and outwardly from one end of the plate and having a hole in an outwardly extending foot on its end to receive a bolt for connecting it to one portion of the motor, a second leg extending downwardly from the lower surface of the plate intermediate its ends and having a hole in an outwardly extending foot on its end to receive a bolt for connecting it to another portion of the motor, an ear projecting upwardly from the other end of the plate and having a hole therein, and another leg extending downwardly from the other end of the plate and having a hole in an outward extension on its end to receive a bolt for connecting it to still another portion of the motor, tapped holes in the bottom of the compressor to receive bolts extending through the slots in the mounting plate, and an additional tapped hole in one end of the compressor to receive a bolt extending through the hole in the ear.

References Cited

UNITED STATES PATENTS 2,456,019  12/1948  Pettipiece _____ 103—218
3,449,924  6/1969   Sudmeier _____ 62—227

ROBERT M. WALKER, Primary Examiner

U.S. Cl. X.R.

62—227

Disclaimer 3,494,540.—*Don P. Dixon*, San Antonio, Tex. AUTOMOBILE AIR CONDITIONING SYSTEM. Patent dated Feb. 10, 1970. Disclaimer filed Aug. 3, 1970, by the inventor.

Hereby enters this disclaimer to claims 1 and 2 of said patent.

[*Official Gazette December 8, 1970.*]